United States Patent [19]
Niki

[11] Patent Number: 6,055,336
[45] Date of Patent: Apr. 25, 2000

[54] IMAGE PROCESSING SYSTEM WHICH CONVERTS MULTI-VALUE IMAGE DATA INTO BINARY IMAGE DATA

[75] Inventor: Toru Niki, Irvine, Calif.

[73] Assignee: Canon Kabushiki Kaisha, Tokyo, Japan

[21] Appl. No.: 08/751,755

[22] Filed: Nov. 18, 1996

[51] Int. Cl.[7] .................................................. G06K 9/36
[52] U.S. Cl. ........................ 382/237; 382/173; 382/176; 382/321
[58] Field of Search .................................. 382/299, 237, 382/272, 176, 156, 173, 321, 177

[56] References Cited

U.S. PATENT DOCUMENTS

| | | | |
|---|---|---|---|
| 4,349,846 | 9/1982 | Sekigawa ................................. | 358/456 |
| 4,360,883 | 11/1982 | Ejiri et al. ................................. | 382/254 |
| 4,771,471 | 9/1988 | Kitamura ................................. | 382/269 |
| 5,212,741 | 5/1993 | Barski et al. ............................ | 382/156 |
| 5,226,094 | 7/1993 | Eschbach ................................ | 382/252 |
| 5,278,918 | 1/1994 | Bernzott et al. ......................... | 382/176 |
| 5,335,290 | 8/1994 | Cullen et al. ............................ | 382/176 |
| 5,363,210 | 11/1994 | Sasaki et al. ............................ | 358/448 |
| 5,369,742 | 11/1994 | Kurosu et al. ........................... | 707/522 |
| 5,608,821 | 3/1997 | Metcalfe et al. ......................... | 382/252 |
| 5,742,703 | 4/1998 | Lin et al. ................................. | 382/176 |
| 5,768,414 | 6/1998 | Jamali ..................................... | 382/173 |
| 5,768,432 | 6/1998 | Schweid .................................. | 382/237 |
| 5,898,507 | 4/1999 | Nakane et al. .......................... | 358/448 |

*Primary Examiner*—Leo H. Boudreau
*Assistant Examiner*—Gregory Desire
*Attorney, Agent, or Firm*—Fitzpatrick, Cella, Harper & Scinto

[57] ABSTRACT

An optical character recognition system recognizes character images in a document image comprised of character areas and non-character areas. The system includes a step of obtaining multi-value image data representing the document image, the multi-value image data having a first resolution and comprising plural pixels each having a pixel density value. The system binarizes the multi-value image data to produce binary image data having a second resolution for the document image, the second resolution being greater than the first resolution. The target pixel in the multi-value image data is binarized based on pixels adjacent to the target pixel. The system further includes steps for performing block selection on the binary image data for the document image in order to identify character areas of the document image and non-character areas of the document image, and performing optical character recognition processing on binary image data for the character areas of the document image to obtain computer codes for recognized character images in the character areas.

33 Claims, 8 Drawing Sheets

IMAGE PROCESSING SYSTEM WHICH CONVERTS MULTI-VALUE IMAGE DATA INTO BINARY IMAGE DATA

BACKGROUND OF THE INVENTION

1. Field Of The Invention

The present invention relates to a system which converts low-resolution multi-value image data, such as gray-scale or color image data, into high-resolution binary image data.

2. Description Of The Related Art

Binary images are formed from black and white pixels only. In contrast, color and gray-scale images are formed from pixels that vary in density to produce colors in addition to black and white. In order to depict such variations, image processing systems represent color and gray-scale pixels using multi-value image data.

In general, multi-value image data can be used to represent many different pixel density values. For example, multi-value image data for pixels of a gray-scale image typically represents density values from 0 to 255, with 0 representing white, 255 representing black, and the values between 0 and 255 representing varying shades of gray. In order to represent such different pixel density values, several bits of data must be used. In the gray-scale image having 256 different levels of gray, for example, eight bits (i.e., $2^8=256$) are required to represent a single pixel of the multi-value image data.

Since multi-value image data can require a large number of bits, particularly in cases where a large number of pixel density values are desired, multi-value image data can take a long time to input, and can require a great deal of storage space. In order to reduce the amount of data to be input and stored, it is common practice for image processing systems to input multi-value images at a low resolution, usually between 100 and 200 dots per inch (hereinafter "dpi").

While low-resolution multi-value image data may be sufficient for many types of processing, optical character recognition (hereinafter "OCR") processing requires higher resolution image data, generally at least 300 dpi, in order to achieve accurate results. However, due to time and storage constraints, as noted above, it is often not practical to input and store multi-value image having a high resolution.

Accordingly, there exists a need for an image processing system that can input low-resolution multi-value image data, yet still achieve accurate OCR processing results.

SUMMARY OF THE INVENTION

The present invention addresses the foregoing need by inputting low-resolution multi-value image data, and binarizing the low-resolution multi-value image data to produce binary image data having a higher resolution. In this manner, the present invention provides high-resolution binary image data, on which accurate OCR processing can be performed, without significantly increasing data input time and data storage requirements.

Moreover, the present invention binarizes a target pixel in the multi-value image data based on pixels adjacent to the target pixel. By binarizing the target pixel based on adjacent pixels, the present invention is able to take into account local image variations, and thereby to increase the resolution of the multi-value image data without significantly distorting the multi-value image.

Thus, according to one aspect, the present invention is a system, i.e., a method, an apparatus, and computer-executable process steps, for converting multi-value image data having a first resolution into binary image data having a second resolution, where the second resolution is greater than the first resolution. The system obtains the multi-value image data having the first resolution, the multi-value image data comprising plural pixels each having a pixel density value. The multi-value image data having the first resolution is then binarized to produce the binary image data having the second resolution. The binarizing includes binarizing a target pixel in the multi-value image data based on pixels adjacent to the target pixel.

In preferred embodiments, the system binarizes a target pixel in the multi-value image data by subdividing the target pixel into plural (e.g., four) sub-pixels, where each sub-pixel corresponds to a binary pixel in the binary image data. In these embodiments, the system then binarizes each sub-pixel to produce a corresponding binary pixel based on a sum of weighted pixel density values for the target pixel and pixels adjacent to either the sub-pixel or the target pixel. By binarizing the target pixel based on a sum of weighted pixel density values for the target pixel and pixels adjacent to either the sub pixel or the target pixel, the present invention is able to vary the relative effects of different pixels on the binarization process.

In this regard, in embodiments of the invention in which the system binarizes each sub-pixel based on a sum of weighted pixel density values for the target pixel and pixels adjacent to the target pixel, the invention uses a weighing factor to calculate a weighted pixel density value for each of the pixels adjacent to the target pixel. In these embodiments, the weighing factor is determined based on a proximity of the pixel to the sub-pixel. By determining the weighing factor based on a proximity to the sub-pixel, the present invention is able to give greater weight to pixels nearer to the sub-pixel, and thereby to give greater weight to image variations that are close to the sub-pixel. Likewise, the present invention is able to give less weight to pixels farther away from the sub-pixel, and thereby to give less weight to image variations farther away from the sub-pixel.

Preferably, the foregoing weighing factors for the pixels adjacent to the target pixel are determined so that the pixels adjacent to the target pixel are weighted symmetrically relative to the sub-pixel, and the target pixel is assigned a weighing factor higher than the weighing factors for pixels adjacent to the target pixel. By weighting the adjacent pixels symmetrically, the invention ensures that pixels equidistant from the sub-pixel will be weighted equally, and by assigning a higher weight to the target pixel, the invention ensures that the pixel closest to the sub-pixel will be given the greatest weight.

According to another aspect, the present invention is an OCR system, i.e., a method, an apparatus, and computer-executable process steps, for recognizing character images in a document image comprised of character areas and non-character areas. The system obtains multi-value image data representing the document image, the multi-value image data having a first resolution and comprising plural pixels each having a pixel density value. Thereafter, the system binarizes the multi-value image data to produce binary image data having a second resolution for the document image, the second resolution being greater than the first resolution. The system binarizes a target pixel in the multi-value image data based on pixels adjacent to the target pixel, and performs block selection on the binary image data for the document image in order to identify character areas of the document image and non-character areas of the document image. OCR processing is then performed on binary image data for the character areas of the document image to obtain computer codes for recognized character images in the character areas.

Thus, the present invention is able to reduce data input time by inputting low-resolution multi-value image data, and to increase recognition accuracy by performing OCR processing on high-resolution binary image data.

In preferred embodiments of the invention, the system stores a copy of the multi-value image data in a memory, and extracts multi-value image data for the non-character areas of the document image identified during block selection from the copy of the multi-value image data stored in the memory. Thereafter, the system stores the computer codes for the recognized character images and the multi-value image data for the non-character areas of the image in the memory.

By virtue of the foregoing preferred embodiments, it is possible accurately to recognize character images in character areas of a document image and to store computer codes corresponding to the recognized characters in a memory, along with multi-value image data for non-character areas of the document image. Thus, it is possible to store a document image comprised of both multi-value image data (e.g., graphics and the like) and computer codes for recognized characters.

This brief summary has been provided so that the nature of the invention may be understood quickly. A more complete understanding of the invention can be obtained by reference to the following detailed description of the preferred embodiments in connection with the attached drawings.

DETAILED DESCRIPTION OF THE PREFERRED EMBODIMENTS

First Embodiment

Figure 1:
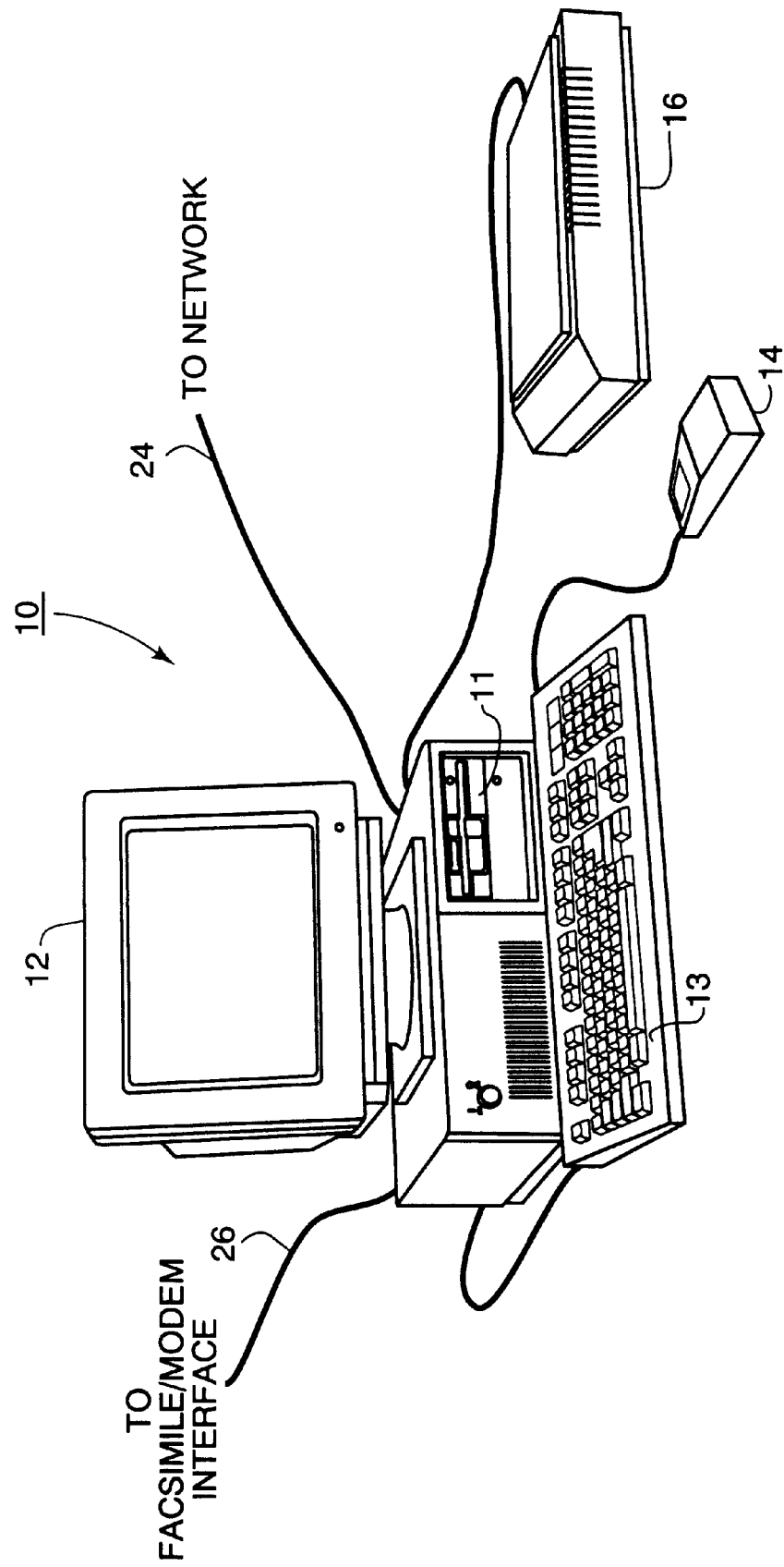
FIG. 1 shows a perspective view of computer hardware used in the present invention.

FIG. 1 is a view showing the outward appearance of computing equipment used in a representative embodiment of the present invention. Shown in FIG. 1 is computing equipment 10, such as a MacIntosh or an IBM PC-compatible computer having a windowing environment, such as Microsoft® Windows95. Provided with computing equipment 10 is display screen 12, such as a color monitor, keyboard 13 for entering text data and user commands, and pointing device 14, such as a mouse, for pointing and for manipulating objects displayed on screen 12.

Computing equipment 10 includes a mass storage device such as computer disk 11 (see FIG. 2) for storing data files which include low-resolution multi-value document image data, computer codes for recognized characters, and other data files in compressed or uncompressed format. Computer disk 11 also stores process steps comprising a character recognition (OCR) program, a block selection program, the binarization program of the present invention, and other information processing application programs by which computing equipment 10 manipulates and stores data files on disk 11 and presents data in those files to an operator via display screen 12.

Preferably, image data is input by scanner 16, which scans document images or other images and provides bit map images of those documents to computing equipment 10. Scanner 16 is capable of inputting multi-value image data for color images and/or gray-scale images. Typically, scanner 16 inputs the multi-value image data at a low resolution, such as 150 dpi, in order to reduce the time it takes to input the multi value image data. Identical data may also be input into computing equipment 10 from a variety of other sources, such as network interface 24 or from other external devices via facsimile/modem interface 26.

It should be understood that, although a programmable general-purpose computer arrangement is shown in FIG. 1, a dedicated or stand-alone computer or other type of data processing equipment can be used in the practice of the present invention.

Figure 2:
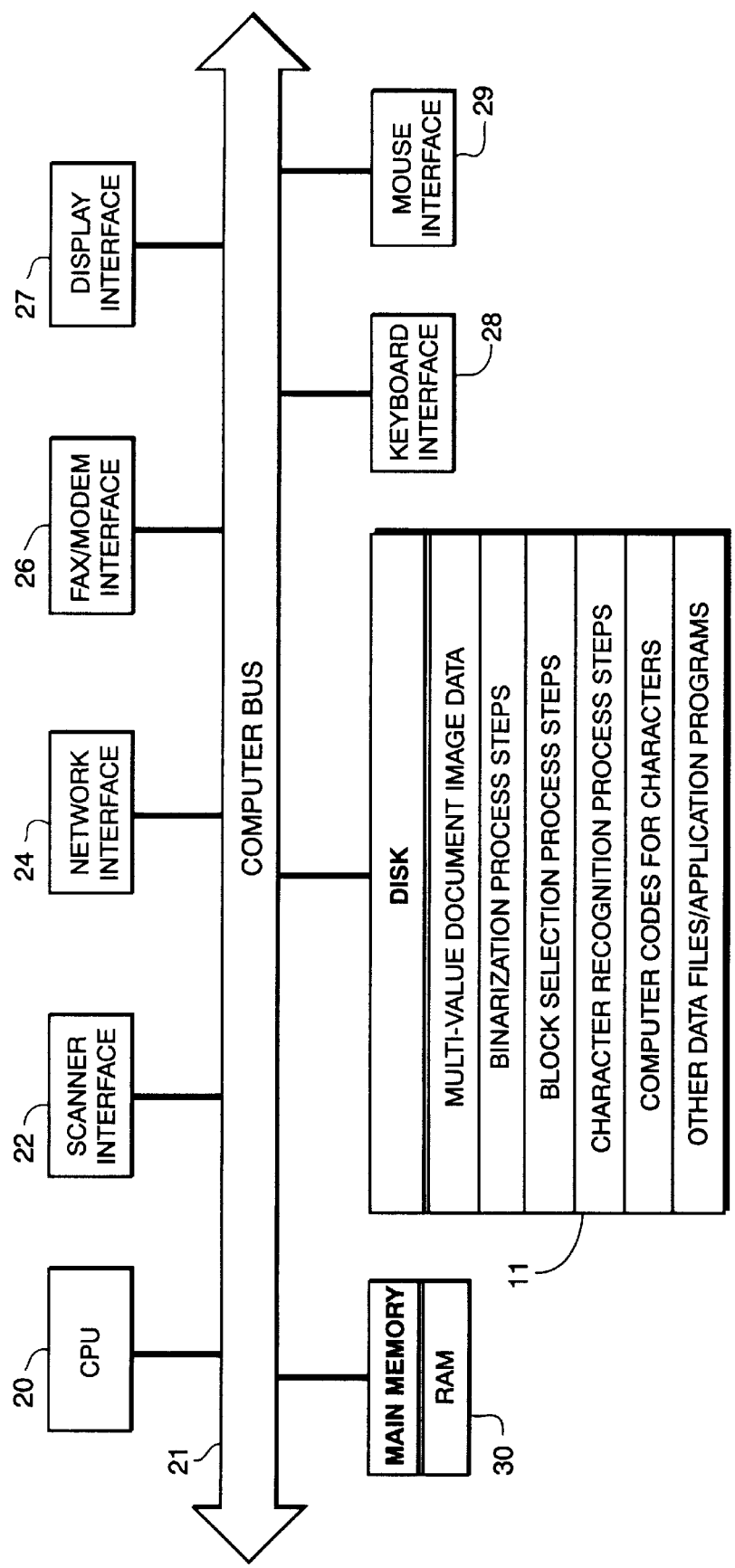
FIG. 2 shows a block diagram of the computer hardware depicted in FIG. 1.

FIG. 2 is a detailed block diagram showing the internal construction of computing equipment 10. As shown in FIG. 2, computing equipment 10 includes a central processing unit (CPU) 20 interfaced with computer bus 21. Also interfaced with computer bus 21 is scanner interface 22, network interface 24, fax/modem interface 26, display interface 27, keyboard interface 28, mouse interface 29, main memory 30, and disk 11.

Main memory 30 interfaces with computer bus 21 so as to provide random access memory storage for use by CPU 20 when executing stored program instructions, such as the above-noted binarization, block selection and OCR process steps. More specifically, CPU 20 loads those programs from disk 11 into main memory 30 and executes those stored programs out of main memory 30.

Figure 3:
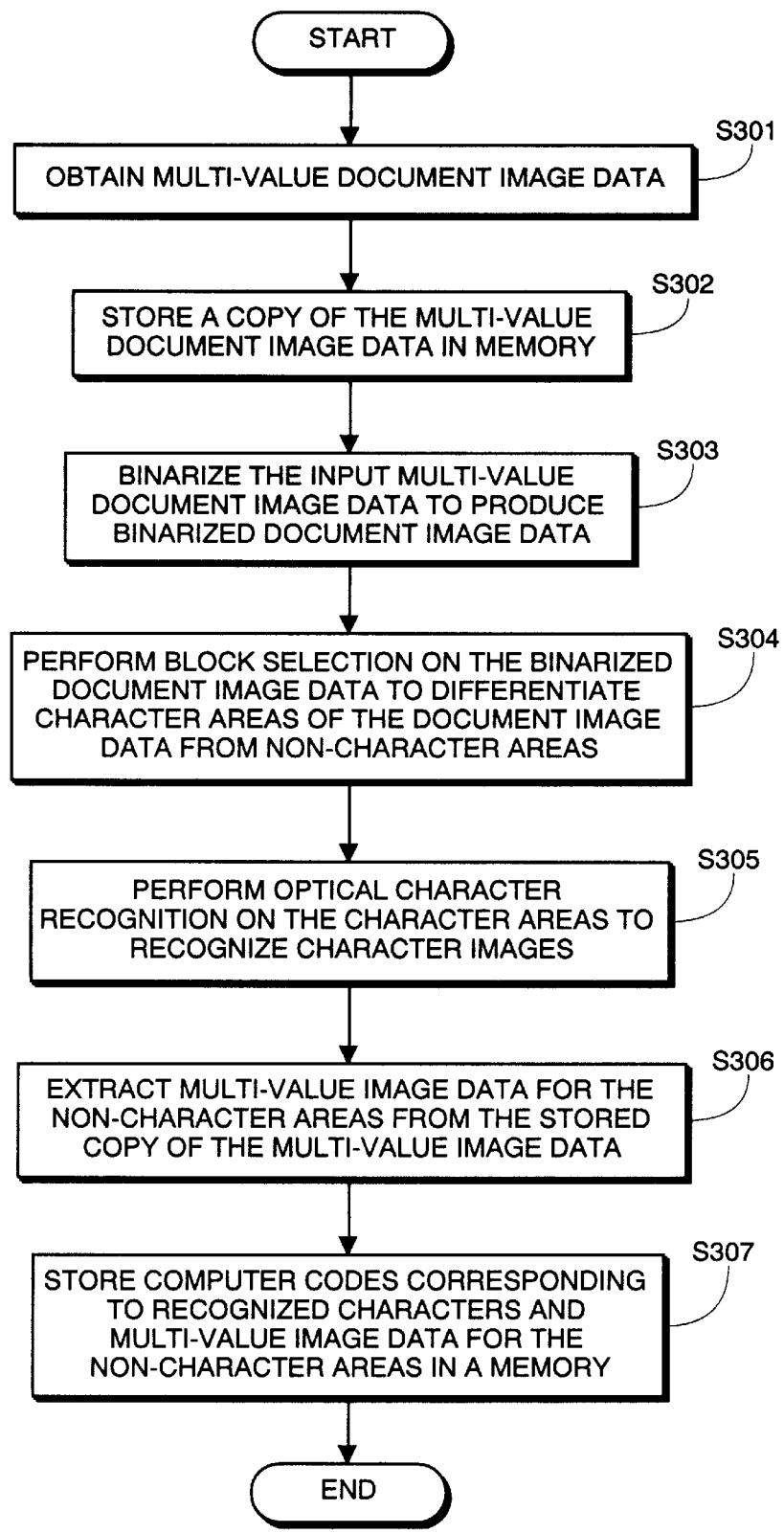
FIG. 3 shows a flow diagram of an OCR processing system which incorporates the present invention.

FIG. 3 shows a flow diagram of an OCR processing system which incorporates the present invention. The process steps shown in FIG. 3 are preferably stored on disk 11, as described above, and executed by CPU 20 out of main memory 30.

Figure 4:
FIG. 4 shows a picture of a multi-value document image processed by the present invention.

Briefly, FIG. 3 depicts an OCR processing system comprising process steps for recognizing character images in a gray-scale or color document image comprised of character areas and non-character areas. An example of such a document image is shown in FIG. 4.

The system of FIG. 3 obtains multi-value image data representing the document image. The multi-value image data has a first resolution and comprises plural pixels, each having a pixel density value. The system stores a copy of the multi-value image data in a memory and, thereafter, binarizes the obtained multi-value image data to produce binary image data having a second resolution for the document image, the second resolution being greater than the first resolution. The system binarizes a target pixel in the multi-value image data based on pixels adjacent to the target pixel, and performs block selection on the binary image data for the document image in order to identify character areas of the document image and non-character areas of the document image. OCR processing is then performed on binary image data for the character areas of the document image to obtain computer codes for recognized character images in the character areas. Multi-value image data for the non-character areas of the document image identified in the block selection step is extracted from the copy of the multi-value image data stored in the memory, and the computer codes for the recognized character images and the multi-value image data for the non-character areas of the image are stored in the memory.

In more detail, step S301 obtains low-resolution multi-value image data from a document image, such as a color image or a gray-scale image. Preferably, the resolution of the obtained multi-value image data is around 150 dpi; although other resolutions can be input as well. The multi-value image data may be obtained by any of the means described above, such as scanner 16, facsimile/modem interface 26, etc. Alternatively, the multi-value image data may be stored in disk 11, or any other memory, beforehand, and obtained in step S301 by reading the multi-value image data from disk 11.

Once the low-resolution multi-value image data for the document image has been obtained by step 301, processing proceeds to step S302. Step S302 stores a copy of the multi-value image data in a memory, such as disk 11. Of course, if the multi-value image data is obtained from the memory, there is no need to store an additional copy of the multi-value image data unless the multi-value image data was erased from the memory.

Figure 5:
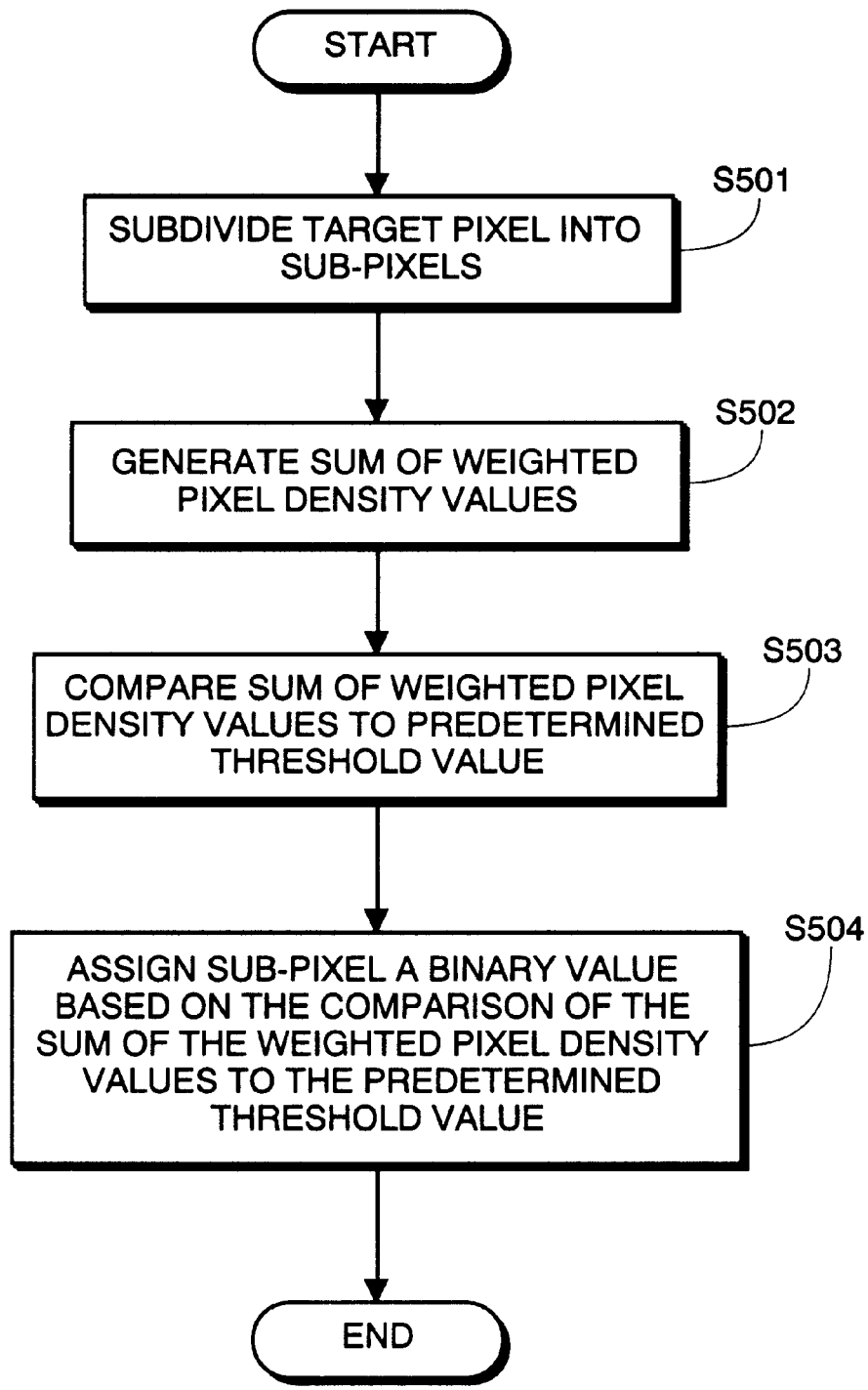
FIG. 5 shows a flow diagram of the binarizing process of the present invention.

Next, step S303 binarizes the low-resolution multi-value image data obtained by step S301 so as to produce binary image data having a high resolution, preferably 300 dpi or greater. FIG. 5 is a flow diagram which depicts the processing performed in step S303 in detail.

More specifically, FIG. 5 is a flow diagram which depicts the binarization process steps stored in disk 11 of FIG. 1. In general, FIG. 5 depicts process steps to subdivide a target pixel in the low-resolution multi-value image data obtained in step S301, and to binarize the target pixel based on pixels adjacent to the target pixel so as to obtain high-resolution binary image data.

Figure 6:
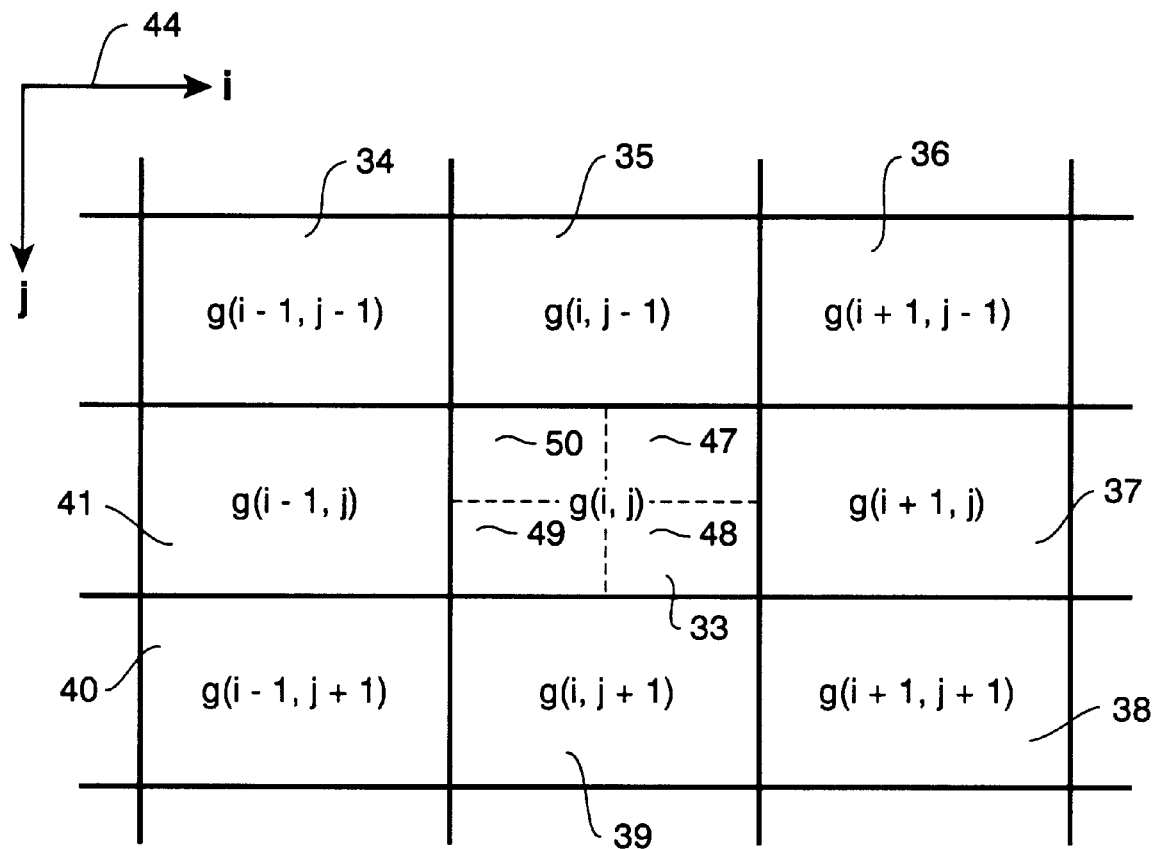
FIG. 6 shows a pixel grid comprising nine multi-value pixels and corresponding pixel density values therefor.

Before going into a detailed description of FIG. 5, a brief description of FIG. 6 will be provided. FIG. 6 depicts multi-value image data for a document image including target pixel 33 surrounded by eight adjacent pixels 34 to 41. As shown in FIG. 6, each pixel has a density value which is defined as "g". Thus, the density value of target pixel 33 at coordinates (i,j) is defined as g(i,j). In this regard, the eight pixels adjacent to target pixel 33 are defined by their relationship to target pixel 33. Accordingly, the density values for the eight pixels adjacent to target pixel 33 are defined as follows:

(1) upper-left pixel $34=g(i-1,j-1)$,
(2) upper-center pixel $35=g(i,j-1)$,
(3) upper-right pixel $36=g(i+1,j-1)$,
(4) center-right pixel $37=g(i+1,j)$,
(5) bottom-right pixel $38=g(i+1,j+1)$,
(6) bottom-center pixel $39=g(i,j+1)$,
(7) bottom-left pixel $40=g(i-1,j+1)$, and
(8) center-left pixel $41=g(i-1,j)$.

Returning to FIG. 5, step S501 subdivides target pixel 33 into sub-pixels 47, 48, 49 and 50, also depicted in FIG. 6. Each of these sub-pixels corresponds to a single pixel in the high-resolution binary image data generated by the present invention, as described in more detail below. In preferred embodiments of the invention, step S501 subdivides the target pixel into four sub-pixels, as shown in FIG. 6, so as to double the resolution of the multi-value image data. It should be noted, however, that the target pixel can be subdivided into other numbers of sub-pixels as well.

Following step S501, processing proceeds to step S502. Step S502 generates a sum of weighted pixel density values for each sub pixel. In this first embodiment, the sum of weighted pixel density values for each sub-pixel comprises a sum of weighted pixel density values for the target pixel and pixels adjacent to the sub-pixel. In this regard, as shown in FIG. 6, each of sub-pixels 47 to 50 is adjacent to three other pixels in the multi-value image data. Thus, for the example shown in FIG. 6, sub-pixel 50 is adjacent to pixels 34, 35 and 41; sub-pixel 47 is adjacent to pixels 35, 36 and 37; sub-pixel 48 is adjacent to pixels 37, 38 and 39; and sub-pixel 49 is adjacent to pixels 39, 40 and 41. In order to calculate a sum of weighted pixel density values for each sub-pixel, the pixel density value for the target pixel and pixels adjacent to sub-pixel are each multiplied by a predetermined weighing factor $W_n$.

Figure 7:
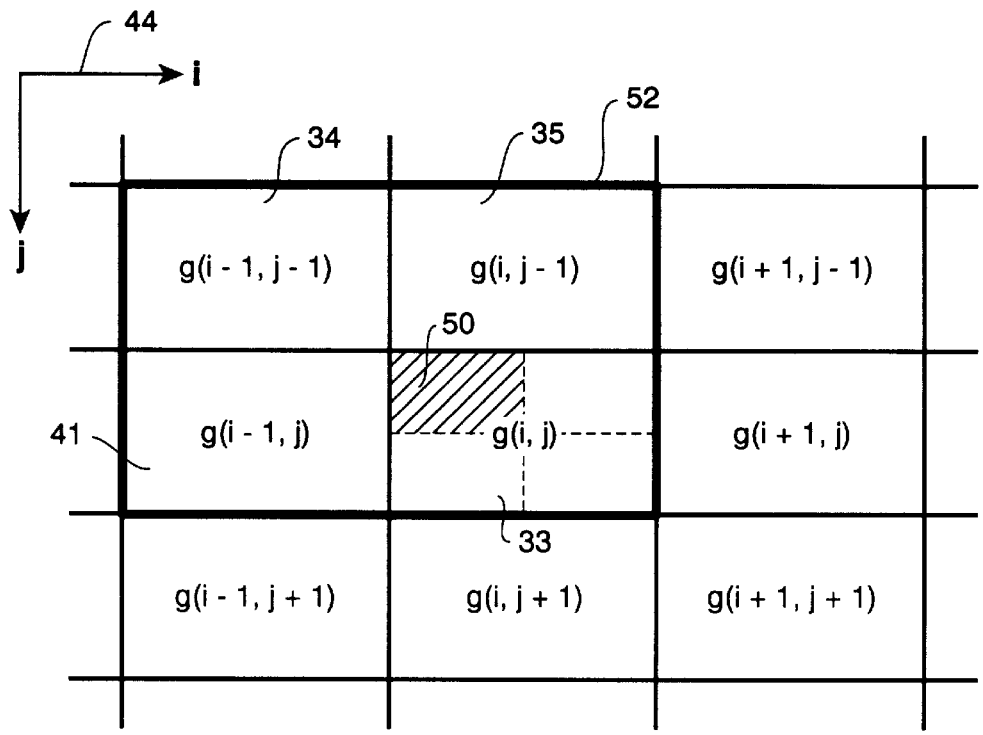
FIGS. 7 to 10 show the pixel grid of FIG. 6 as it relates to processing four different sub-pixels using the first embodiment of the present invention.

Thus, referring to FIG. 7, step S502 determines the sum of weighted pixel density values for sub-pixel 50 based on pixels 33, 34, 35 and 41, all of which are outlined by rectangle 52. In mathematical terms, the sum "Σ" of weighted pixel density values for sub pixel 50 is as follows:

$\Sigma_{50}=W_0 \cdot g(i,j)+W_1 \cdot g(i,j-1)+W_2 \cdot g(i-1,j)+W_3 \cdot g(i-1,j-1)$.

Figure 8:
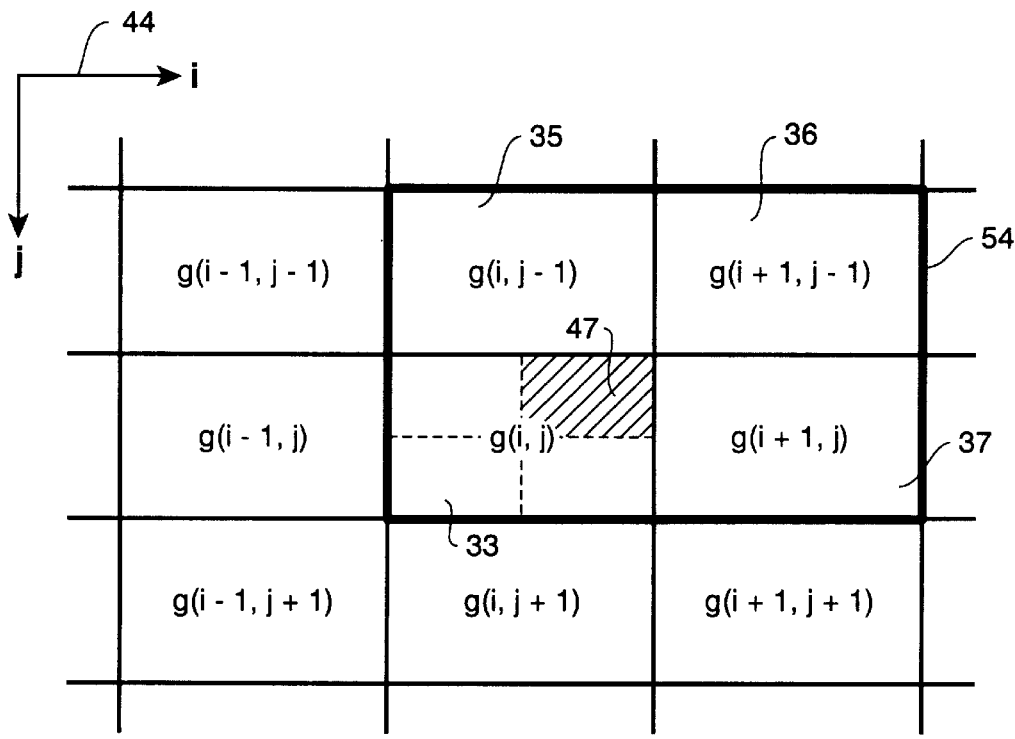
Figure 9:
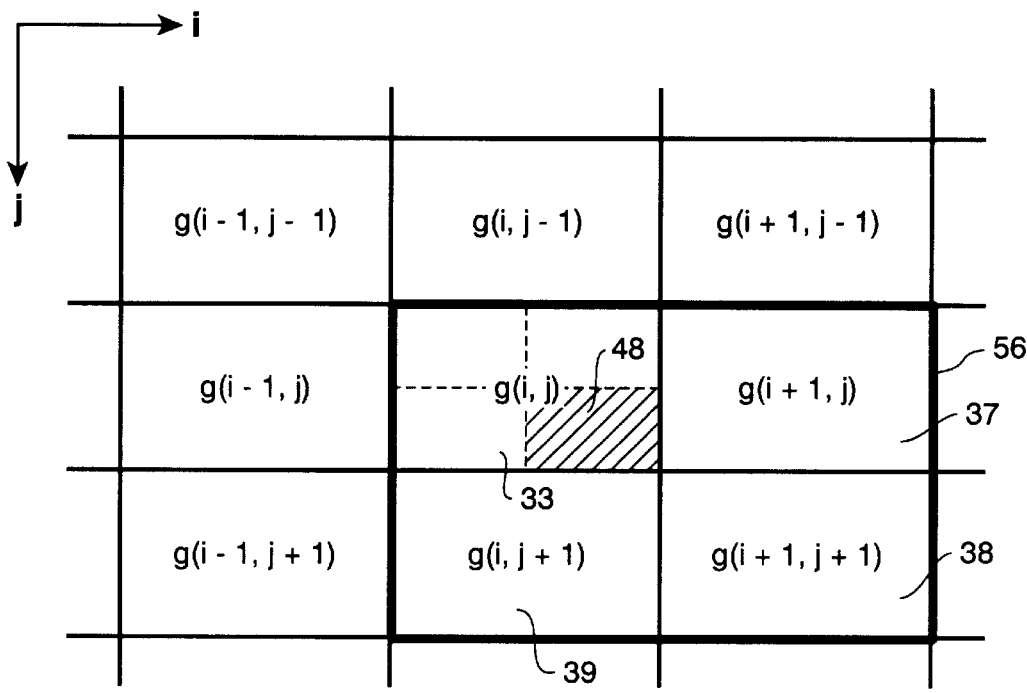

Referring to FIG. 8, step S502 determines the sum of weighted pixel density values for sub-pixel 47 based on pixels 33, 35, 36 and 37, all of which are outlined by rectangle 54. In mathematical terms, the sum "Σ" of weighted pixel density values for sub pixel 47 is as follows:

$\Sigma_{47}=W_0 \cdot g(i,j)+W_1 \cdot g(i,j-1)+W_2 \cdot g(i+1,j)+W_3 \cdot g(i+1,j-1)$ Referring to FIG. 9, step S502 determines the sum of weighted pixel density values for sub-pixel 48 based on pixels 33, 37, 38 and 39, all of which are outlined by rectangle 56. In mathematical terms, the sum "Σ" of weighted pixel density values for sub pixel 48 is as follows:

$\Sigma_{48}=W_0 \cdot g(i,j)+W_1 \cdot g(i,j+1)+W_2 \cdot g(i+1,j)+W_3 \cdot g(i+1,j+1)$.

Figure 10:
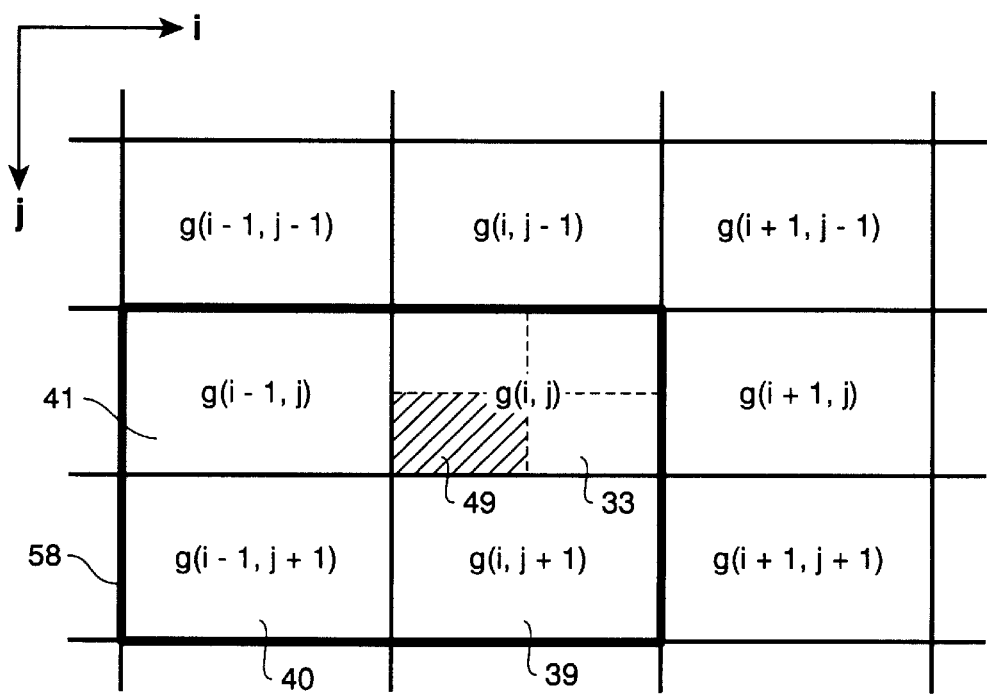

Finally, referring to FIG. 10, step S502 determines the sum of weighted pixel density values for sub-pixel 49 based on pixels 33, 39, 40 and 41, all of which are outlined by rectangle 58. In mathematical terms, the sum "Σ" of weighted pixel density values for sub pixel 49 is as follows:

$\Sigma_{49}=W_0 \cdot g(i,j)+W_1 \cdot g(i-1,j)+W_2 \cdot g(i,j+1)+W_3 \cdot g(i-1,j+1)$.

Each of the predetermined weighing factors $W_n$ is experimentally determined and is preferably set in CPU 20, or stored in disk 11, prior to execution of the process steps of the present invention. In a preferred embodiment of the invention, $W_1$, $W_2$ and $W_3$ are set to a value of "1" and $W_0$ is set to a value of "3". By giving more weight to $W_0$ than to $W_1$, $W_2$ and $W_3$, this embodiment ensures that the pixel closest in proximity to a sub-pixel, i.e., target pixel 33, which is literally on top of each sub-pixel, is given more weight than pixels adjacent to the sub-pixel.

It is noted that the foregoing describes calculating sums of weighted pixel density values for all of the sub-pixels prior to proceeding to step S503. This is done for explanatory purposes only. In preferred embodiments of the invention, a sum is calculated for a sub-pixel, and then processing proceeds to step S503 prior to calculating a sum for another sub-pixel.

In this regard, once a sum of weighted pixel density values for a particular sub-pixel has been determined in step S502, processing proceeds to step S503. Step S503 compares the sum, e.g., $\Sigma_{47}$, $\Sigma_{48}$, $\Sigma_{49}$ and $\Sigma_{50}$, to a predetermined threshold value "T". This predetermined threshold value "T" is experimentally determined and is preferably set in CPU 20, or stored in disk 11, prior to execution of the process steps of the present invention.

Next, step S504 assigns a binary value to the sub-pixel whose sum was compared in step S503. This is done by assigning the sub-pixel a binary value of "0" (i.e., "white"/ "off") in a case that the sum of weighted pixel density values for that sub-pixel is less than or equal to the predetermined threshold value "T", and assigning the sub-pixel a binary value of "1" (i.e., "black"/"on") in a case that the sum of weighted pixel density values for the sub-pixel is greater than the predetermined threshold value "T".

Thus, for sub-pixel 47, step S504 compares $\Sigma_{47}$ to "T"; for sub-pixel 48, step S504 compares $\Sigma_{48}$ to "T", for sub pixel 49, step S504 compares $\Sigma_{49}$ to "T"; and for sub-pixel 50, step S504 compares $\Sigma_{50}$ to "T". Based on these comparisons, step S504 assigns each of these four sub-pixels a value of "0" or "1".

In the foregoing manner, the present invention generates four binary pixels from a single multi-value target pixel. By doing this for all of the pixels in the multi-value image data, the present invention both binarizes the multi-value image data and increases the resolution of the multi-value image data.

In this regard, it should be noted that for sub-pixels having no adjacent pixels, such as those at edges of the document image, there may or may not be pixels corresponding to $W_1$, $W_2$ and $W_3$. In such cases, $W_1$, $W_2$ and $W_3$ can be set to "0" accordingly so as to discount non-existent pixels.

Following step S504, processing returns to FIG. 3, specifically to step S304. Step S304 performs block selection on the document image data binarized in step S303 in order to identify character areas of the document image and non-character areas of the document image. Block selection can be performed in accordance with the technique set forth in co-pending U.S. patent application Ser. No. 08/361,240, entitled "BLOCK SELECTION REVIEW AND EDITING SYSTEM", the contents of which are hereby incorporated by reference into the present application.

Following step S304, processing proceeds to step S305, which performs OCR processing on the character areas of the binarized document image data identified in step S304. OCR processing may be performed by any conventional method, many of which are well-known to those of ordinary skill in the art of image processing. Computer codes, such as ASCII characters, are generated for character images which are recognized in the character areas of the document image. After OCR processing has finished, flow proceeds to step S306.

Step S306 extracts multi-value image data for the non-character areas of the document image from the copy of the multi-value document image data stored in step S302. Step S307 then stores the multi-value image data for the non-character areas and the computer codes for the recognized character images in a memory, such as disk 11. In preferred embodiments of the invention, the multi-value image data for the non-character areas and the computer codes corresponding to the recognized characters are stored in document format so as to re-create the originally-input document image.

Following step S307, processing for the first embodiment of the present invention ends.

Second Embodiment

The second embodiment of the present invention is identical to the first embodiment of the present invention in all respects except for step S303, process steps for which are shown in FIG. 5. Accordingly, only those process steps will be described for the sake of brevity.

In this regard, in contrast to step S303 of the first embodiment, which binarizes each sub-pixel to produce a corresponding binary pixel based on a sum of weighted pixel density values for the target pixel and pixels adjacent "to the sub pixel", in the second embodiment, step S303 binarizes each sub-pixel to produce a corresponding binary pixel based on a sum of weighted pixel density values for the target pixel and pixels adjacent "to the target pixel". Thus, in the second embodiment, weighted pixel density values are calculated for all eight pixels surrounding the target pixel, and a binary value of each sub-pixel is determined based on a comparison of a sum of the eight weighted pixel density values to a predetermined threshold value "T".

Accordingly, with reference to FIGS. 5 and 6, in the second embodiment, step S501 is identical to that for the first embodiment. Accordingly, a detailed description thereof is omitted here.

In step S502, on the other hand, the sum of weighted pixel density values for each sub-pixel comprises a sum of weighted pixel density values for target pixel 33 and the eight pixels adjacent to the target pixel, i.e., pixels 34 to 41, shown in FIG. 6. In order to calculate a sum of weighted pixel density values for each sub-pixel, the pixel density value for the target pixel and pixels adjacent to target are again each multiplied by a predetermined weighing factor $W_n$.

Thus, in the second embodiment, step S502 determines the sum of weighted pixel density values for sub-pixel 50 as follows:

$\Sigma_{50}=W_1 \cdot g(i-1,j-1)+W_2 \cdot g(i,j-1)+W_3 \cdot g(i+1,j-1)+W_4 \cdot g(i-1,j)+W_5 \cdot g(i,j)+W_6 \cdot g(i+1,j)+W_7 \cdot g(i-1,j+1)+W_8 \cdot g(i,j+1)+W_9 \cdot g(i+1,j+1)$.

In the second embodiment, step S502 determines the sum of weighted pixel density values for sub-pixel 47 as follows:

$\Sigma_{47}=W_7 \cdot g(i-1,j-1)+W_4 \cdot g(i,j-1)+W_1 \cdot g(i+1,j-1)+W_8 \cdot g(i-1,j)+W_5 \cdot g(i,j)+W_2 \cdot g(i+1,j)+W_9 \cdot g(i-1,j+1)+W_6 \cdot g(i,j+1)+W_3 \cdot g(i+1,j+1)$.

In the second embodiment, step S502 determines the sum of weighted pixel density values for sub-pixel 48 as follows:

$\Sigma_{48}=W_9 \cdot g(i-1,j-1)+W_8 \cdot g(i,j-1)+W_7 \cdot g(i+1,j-1)+W_6 \cdot g(i-1,j)+W_5 \cdot g(i,j)+W_4 \cdot g(i+1,j)+W_3 \cdot g(i-1,j+1)+W_2 \cdot g(i,j+1)+W_1 \cdot g(i+1,j+1)$.

Finally, in the second embodiment, step S502 determines the sum of weighted pixel density values for sub-pixel 49 as follows:

$\Sigma_{49}=W_3 \cdot g(i-1,j-1)+W_6 \cdot g(i,j-1)+W_9 \cdot g(i+1,j-1)+W_2 \cdot g(i-1,j)+W_5 \cdot g(i,j)+W_8 \cdot g(i+1,j)+W_1 \cdot g(i-1,j+1)+W_4 \cdot g(i,j+1)+W_7 \cdot g(i+1,j+1)$.

As was the case in the first embodiment above, the predetermined weighing factors, i.e., $W_1$, $W_2$, $W_3$, $W_4$, $W_5$, $W_6$, $W_7$, $W_8$ and $W_9$, are determined experimentally and are preferably pre-set within CPU 20 or pre-stored in disk 11. Each weighing factor for each pixel is based on a proximity to a sub-pixel being binarized. Taking sub-pixel 50 as an example, $W_1$ corresponds to pixel 34, $W_2$ corresponds to pixel 35, $W_3$ corresponds to pixel 36, $W_4$ corresponds to pixel 41, $W_5$ corresponds to target pixel 33, $W_6$ corresponds to pixel 37, $W_7$ corresponds to pixel 40, $W_8$ corresponds to pixel 39, and $W_9$ corresponds to pixel 38. During calculation of the sum of weighted pixel density values, $W_5$ is assigned the highest value since target pixel 33 is closest (literally on top of) sub-pixel 50; $W_1$, $W_2$ and $W_4$ are assigned the next highest values since their corresponding pixels are each adjacent to sub-pixel 50; and $W_3$, $W_6$, $W_7$, $W_8$ and $W_9$ are assigned the lowest values since their corresponding pixels are farthest away from sub-pixel 50.

In particularly preferred embodiments of the invention, values for $W_n$ are assigned so that the pixels adjacent to the sub-pixel are weighted symmetrically relative to the sub-pixel. Taking sub-pixel 50 as an example, in these preferred embodiments, $W_2$ and $W_4$ are assigned the same value since their corresponding pixels are symmetric relative to sub pixel 50. The same is true for $W_3$ and $W_7$, and $W_6$ and $W_8$. In this manner, pixels at the same distance from the sub-pixel are assigned the same weights.

Examples of preferred values for $W_n$ are shown below. It should be noted that other values can be set as necessary.

Example 1

$W_5=3$
$W_1=W_2=W_4=1$
$W_3=W_6=W_7=W_8=W_9=0$

Example 2

$W_5=6$
$W_1=W_2=W_4=2$
$W_3=W_6=W_7=W_8=1$
$W_9=0$

Following step S502, processing proceeds identically to that described above with respect to the first embodiment of the invention. Accordingly, a detailed description thereof is omitted here for the sake of brevity.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method of converting multi-value image data having a first resolution into binary image data having a second resolution, the second resolution being greater than the first resolution, the method comprising the steps of:

obtaining the multi-value image data having the first resolution, the multi-value image data comprising plural pixels each having a pixel density value; and binarizing the multi-value image data having the first resolution to produce the binary image data having the second resolution, the binarizing step binarizing a target pixel in the multi-value image data based on pixels adjacent the target pixel, wherein the binarizing step further comprises the steps of subdividing the target pixel into plural sub-pixels, each sub-pixel corresponding to a binary pixel in the binary image data, and binarizing each sub-pixel based on a sum of weighted pixel density values for the target pixel and pixels adjacent the target pixel, and wherein for each sub-pixel, weights used to calculate the weighted pixel density values include at least a first non-zero weight and a second non-zero weight, the first non-zero weight for a first pixel that is adjacent the target pixel and adjacent the sub-pixel, and the second non-zero weight for a second pixel that is adjacent the target pixel but not adjacent the sub-pixel.

2. A method according to claim 1, wherein the step of binarizing each sub-pixel comprises the steps of:

comparing the sum of weighted pixel density values to a predetermined threshold value;

assigning the sub-pixel a value of zero in a case that the sum of weighted pixel density values is less or equal to than the predetermined threshold value; and assigning the sub-pixel a value of one in a case that the sum of weighted pixel density values is greater than the predetermined threshold value.

3. A method according to claim 1, wherein the subdividing step comprises subdividing the target pixel into four sub-pixels; and wherein a sum of weighted pixel density values corresponding to each sub-pixel comprises a sum of weighted pixel density values for the target pixel and three pixels adjacent to the sub pixel.

4. A method according to claim 1, wherein at least some of the weights used to calculate the weighted pixel density values are zero.

5. A method according to claim 4, wherein the step of binarizing each sub-pixel comprises the steps of:

comparing the sum of weighted pixel density values to a predetermined threshold value;

assigning the sub-pixel a value of zero in a case that the sum of weighted pixel density values is less than or equal to the predetermined threshold value; and assigning the sub-pixel a value of one in a case that the sum of weighted pixel density values is greater than the predetermined threshold value.

6. A method according to claim 4, wherein the subdividing step comprises subdividing the target pixel into four sub-pixels; and wherein a sum of weighted pixel density values corresponding to a sub-pixel comprises a sum of weighted pixel density values for the target pixel and eight pixels adjacent to the target pixel.

7. A method according to claim 6, wherein a weighing factor is used to calculate a weighted pixel density value for each of the eight pixels adjacent to the target pixel; and wherein each weighing factor for each pixel is determined based on a proximity of the pixel to the sub-pixel.

8. A method according to claim 7, wherein the weighing factors for the pixels adjacent to the target pixel are determined so that the pixels adjacent to the target pixel are weighted symmetrically relative to the sub-pixel; and wherein the target pixel is assigned a weighing factor higher than the weighing factors for pixels adjacent to the target pixel.

9. An optical character recognition method for recognizing character images in a document image comprised of character areas and non-character areas, the method comprising the steps of:

obtaining multi-value image data representing the document image, the multi-value image data having a first resolution and comprising plural pixels each having a pixel density value;

binarizing the multi-value image data having the first resolution to produce binary image data having a second resolution for the document image, the second resolution being greater than the first resolution, the binarizing step binarizing a target pixel in the multi-value image data based on multi-value image data having the first resolution for pixels adjacent to the target pixel;

performing block selection on the binary image data having the second resolution for the document image in order to identify character areas of the document image and non-character areas of the document image; and performing optical character recognition processing on binary image data having the second resolution for the character areas of the document image to obtain computer codes for recognized character images in the character areas, wherein binarizing the target pixel further comprises the steps of subdividing the target pixel into plural sub-pixels, each sub-pixel corresponding to a binary pixel in the binary image data, and binarizing each sub-pixel based on a sum of weighted pixel density values for the target pixel and pixels adjacent the target pixel, and wherein for each sub-pixel, weights used to calculate the weighted pixel density values include at least a first non-zero weight and a second non-zero weight, the first non-zero weight for a first pixel that is adjacent the target pixel and adjacent the sub-pixel, and the second non-zero weight for a second pixel that is adjacent the target pixel but not adjacent the sub-pixel.

10. A method according to claim 9, wherein the step of obtaining the multi-value image data comprises scanning the document image to obtain the multi-value image data.

11. A method according to claim 9, further comprising the steps of:

storing a copy of the multi-value image data in a memory;

extracting multi-value image data for the non-character areas of the document image identified in the block selection step from the copy of the multi-value image data stored in the memory; and storing the computer codes for the recognized character images and the multi-value image data for the non-character areas of the image in the memory.

12. An apparatus for converting multi-value image data having a first resolution into binary image data having a second resolution, the second resolution being greater than the first resolution, the apparatus comprising:

obtaining means for obtaining the multi-value image data having the first resolution, the multi-value image data comprising plural pixels each having a pixel density value;

a memory which stores process steps executable by a processor; and a processor which executes the process steps stored in the memory to binarize the multi-value image data having the first resolution to produce the binary image data having the second resolution, the processor binarizing a target pixel in the multi-value image data based on pixels adjacent the target pixel, wherein binarizing the target pixel further comprises the steps of subdividing the target pixel into plural sub-pixels, each sub-pixel corresponding to a binary pixel in the binary image data, and binarizing each sub-pixel based on a sum of weighted pixel density values for the target pixel and pixels adjacent the target pixel, and wherein for each sub-pixel, weights used to calculate the weighted pixel density values include at least a first non-zero weight and a second non-zero weight, the first non-zero weight for a first pixel that is adjacent the target pixel and adjacent the sub-pixel, and the second non-zero weight for a second pixel that is adjacent the target pixel but not adjacent the sub-pixel.

13. An apparatus according to claim 12, wherein the processor binarizes each sub-pixel by comparing the sum of weighted pixel density values to a predetermined threshold value, assigning the sub-pixel a value of zero in a case that the sum of weighted pixel density values is less than or equal to the predetermined threshold value, and assigning the sub-pixel a value of one in a case that the sum of weighted pixel density values is greater than the predetermined threshold value.

14. An apparatus according to claim 12, wherein the processor subdivides the target pixel into four sub-pixels; and wherein a sum of weighted pixel density values corresponding to each sub-pixel comprises a sum of weighted pixel density values for the target pixel and three pixels adjacent to the sub pixel.

15. An apparatus according to claim 12, wherein at least some of the weights used to calculate the weighted pixel density values are zero.

16. An apparatus according to claim 15, wherein the processor binarizes each sub-pixel by comparing the sum of weighted pixel density values to a predetermined threshold value, assigning the sub-pixel a value of zero in a case that the sum of weighted pixel density values is less than or equal to the predetermined threshold value, and assigning the sub-pixel a value of one in a case that the sum of weighted pixel density values is greater than the predetermined threshold value.

17. An apparatus according to claim 15, wherein the processor subdivides the target pixel into four sub-pixels; and wherein a sum of weighted pixel density values corresponding to a sub-pixel comprises a sum of weighted pixel density values for the target pixel and eight pixels adjacent to the target pixel.

18. An apparatus according to claim 17, wherein a weighing factor is used to calculate a weighted pixel density value for each of the eight pixels adjacent to the target pixel; and wherein each weighing factor for each pixel is determined based on a proximity of the pixel to the sub-pixel.

19. An apparatus according to claim 18, wherein weighing factors for pixels adjacent to the target pixel are determined so that pixels adjacent to the target pixel are weighted symmetrically relative to the sub-pixel; and wherein the target pixel is assigned a weighing factor higher than the weighing factors for pixels adjacent to the target pixel.

20. An optical character recognition apparatus for recognizing character images in a document image comprised of character areas and non-character areas, the apparatus comprising:

an obtaining means for obtaining multi-value image data representing the document image, the multi-value image data having a first resolution and comprising plural pixels each having a pixel density value;

a memory which stores process steps for execution by a processor and computer codes for recognized character images; and a processor which executes the process steps stored in the memory (1) to binarize the multi-value image data having the first resolution to produce binary image data having a second resolution for the document image, the second resolution being greater than the first resolution, the processor binarizing a target pixel in the multi-value image data based on multi-value image data having the first resolution for pixels adjacent to the target pixel, (2) to perform block selection on the binary image data having the second resolution for the document image in order to identify character areas of the document image and non-character areas of the document image, and (3) to perform optical character recognition processing on binary image data having the second resolution for the character areas of the document image to obtain computer codes for recognized character images in the character areas, wherein binarizing the target pixel further comprises the steps of subdividing the target pixel into plural sub-pixels, each sub-pixel corresponding to a binary pixel in the binary image data, and binarizing each sub-pixel based on a sum of weighted pixel density values for the target pixel and pixels adlacent the target pixel, and wherein for each sub-pixel, weights used to calculate the weighted pixel density values include at least a first non-zero weight and a second non-zero weight, the first non-zero weight for a first pixel that is adjacent the target pixel and adjacent the sub-pixel, and the second non-zero weight for a second pixel that is adjacent the target pixel but not adjacent the sub-pixel.

21. An apparatus according to claim 20, wherein the obtaining means comprises a scanner for obtaining the multi-value image data by scanning the document image.

22. An apparatus according to claim 20, wherein the processor executes process steps stored in the memory to store a copy of the multi-value image data obtained by the obtaining means in the memory, to extract multi-value image data for the non-character areas of the document image identified during block selection from the copy of the multi-value image data stored in the memory, and to store the computer codes for the recognized character images and the multi-value image data for the non-character areas of the image in the memory.

23. Computer-executable process steps stored on a computer-readable medium, the computer executable process steps to convert multi-value image data having a first resolution into binary image data having a second resolution, the second resolution being greater than the first resolution, the computer-executable process steps comprising:

an obtaining step to obtain the multi-value image data having the first resolution, the multi-value image data comprising plural pixels each having a pixel density value; and a binarizing step to binarize the multi-value image data having the first resolution to produce the binary image data having the second resolution, the binarizing step binarizing a target pixel in the multi-value image data based on pixels adjacent the target pixel, wherein the binarizing step further comprises the steps of subdividing the target pixel into plural sub-pixels, each sub-pixel corresponding to a binary pixel in the binary image data, and binarizing each sub-pixel based on a sum of weighted pixel density values for the target pixel and pixels adjacent the target pixel, and wherein for each sub-pixel, weights used to calculate the weighted pixel density values include at least a first non-zero weight and a second non-zero weight, the first non-zero weight for a first pixel that is adjacent the target pixel and adjacent the sub-pixel, and the second non-zero weight for a second pixel that is adjacent the target pixel but not adjacent the sub-pixel.

24. Computer-executable process steps according to claim 23, wherein the sub-pixel binarizing step comprises:

a comparing step to compare the sum of weighted pixel density values to a predetermined threshold value;

a first assigning step to assign the sub-pixel a value of zero in a case that the sum of weighted pixel density values is less than or equal to the predetermined threshold value; and a second assigning step to assign the sub-pixel a value of one in a case that the sum of weighted pixel density values is greater than the predetermined threshold value.

25. Computer-executable process steps according to claim 23, wherein the subdividing step comprises subdividing the target pixel into four sub-pixels; and wherein a sum of weighted pixel density values corresponding to each sub-pixel comprises a sum of weighted pixel density values for the target pixel and three pixels adjacent to the sub-pixel.

26. Computer-executable process steps according to claim 23, wherein at least some of the weights used to calculate the weighted pixel density values are zero.

27. Computer-executable process steps according to claim 26, wherein the sub-pixel binarizing step comprises:

a comparing step to compare the sum of weighted pixel density values to a predetermined threshold value;

a first assigning step to assign the sub-pixel a value of zero in a case that the sum of weighted pixel density values is less than or equal to the predetermined threshold value; and a second assigning step to assign the sub-pixel a value of one in a case that the sum of weighted pixel density values is greater than the predetermined threshold value.

28. Computer-executable process steps according to claim 26, wherein the subdividing step comprises subdividing the target pixel into four sub-pixels; and wherein a sum of weighted pixel density values corresponding to each sub-pixel comprises a sum of weighted pixel density values for the target pixel and eight pixels adjacent to the target pixel.

29. Computer-executable process steps according to claim 28, wherein a weighing factor is used to calculate a weighted pixel density value for each of the eight pixels adjacent to the target pixel; and wherein each weighing factor for each pixel is determined based on a proximity of the pixel to the sub-pixel.

30. Computer-executable process steps according to claim 29, wherein weighing factors for pixels adjacent to the target pixel are determined so that pixels adjacent to the target pixel are weighted symmetrically relative to the sub-pixel; and wherein the target pixel is assigned a weighing factor higher than the weighing factors for pixels adjacent to target pixel.

31. Computer-executable process steps stored on a computer-readable medium, the computer-executable process steps to perform optical character recognition processing to recognize character images in a document image comprised of character areas and non-character areas, the computer-executable process steps comprising:

an obtaining step to obtain multi-value image data representing the document image, the multi-value image data having a first resolution and comprising plural pixels each having a pixel density value;

a binarizing step to binarize the multi-value image data having the first resolution to produce binary image data having a second resolution for the document image, the second resolution being greater than the first resolution, the binarizing step binarizing a target pixel in the multi-value image data based on multi-value image data having the first resolution for pixels adjacent to the target pixel;

a block selection step to perform block selection on the binary image data having the second resolution for the document image in order to identify character areas of the document image and non-character areas of the document image; and an optical character recognition step for performing optical character recognition processing on binary image data having the second resolution for the character areas of the document image to obtain computer codes for recognized character images in the character areas, wherein the binarizing step further comprises the steps of
subdividing the target pixel into plural sub-pixels, each sub-pixel corresponding to a binary pixel in the binary image data, and binarizing each sub-pixel based on a sum of weighted pixel density values for the target pixel and pixels adjacent the target pixel, and wherein for each sub-pixel, weights used to calculate the weighted pixel density values include at least a first non-zero weight and a second non-zero weight, the first non-zero weight for a first pixel that is adjacent the target pixel and adjacent the sub-pixel, and the second non-zero weight for a second pixel that is adjacent the target pixel but not adjacent the sub-pixel.

32. Computer-executable process steps according to claim 31, wherein the obtaining step comprises scanning the document image to obtain the multi-value image data.

33. Computer-executable process steps according to claim 31, further comprising:

a first storing step to store a copy of the multi-value image data for the document image in a memory;

an extracting step to extract multi-value image data for the non-character areas of the document image identified in the block selection step from the copy of the multi-value image data stored in the memory; and a second storing step to store the computer codes for the recognized character images and the multi-value image data for the non-character areas of the image in the memory.

* * * * *